(12) United States Patent
Tynderfeldt et al.

(10) Patent No.: US 7,796,568 B2
(45) Date of Patent: Sep. 14, 2010

(54) METHOD AND APPARATUS FOR DETERMINING THE CONTENT OF BURSTS TO BE TRANSMITTED FROM A BASE STATION

(75) Inventors: Tobias Tynderfeldt, Solna (SE); Stephen Craig, Nacka (SE); Ari Kangas, Lindingö (SE); Stefan Eriksson, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 686 days.

(21) Appl. No.: 10/596,274

(22) PCT Filed: Dec. 18, 2003

(86) PCT No.: PCT/SE03/02011

§ 371 (c)(1),
(2), (4) Date: Aug. 28, 2007

(87) PCT Pub. No.: WO2005/060303

PCT Pub. Date: Jun. 30, 2005

(65) Prior Publication Data

US 2008/0025266 A1  Jan. 31, 2008

(51) Int. Cl.
*H04B 7/212* (2006.01)

(52) U.S. Cl. ............... 370/337; 370/321; 370/347; 455/525; 455/436; 455/437

(58) Field of Classification Search ........... 455/525, 455/436, 437; 370/337
See application file for complete search history.

(56) References Cited

U.S. PATENT DOCUMENTS

| 5,995,499 A | * | 11/1999 | Hottinen et al. | 370/337 |
| 6,038,238 A | | 3/2000 | Jokinen et al. | |
| 6,144,710 A | * | 11/2000 | Chen et al. | 375/346 |
| 6,594,250 B1 | | 7/2003 | Silventoinen et al. | |

(Continued)

FOREIGN PATENT DOCUMENTS

| WO | 0191495 A1 | 11/2001 |
| WO | 02/096149 A1 | 11/2002 |

OTHER PUBLICATIONS

PCT International Search Report, mailed Jul. 13, 2004, in connection with International Application No. PCT/SE2003/002011.

(Continued)

*Primary Examiner*—Lester Kincaid
*Assistant Examiner*—Charles Shedrick
(74) *Attorney, Agent, or Firm*—Potomac Patent Group PLLC (57) ABSTRACT

A method and apparatus for determining the content in bursts to be transmitted from a base station in a mobile network on a broadcast frequency in specific timeslots of a broadcast frequency frame structure. A current state of the logical channel allocated to the forthcoming burst is checked, and the content in the forthcoming burst is determined depending on the current channel state. A dummy burst with a base station specific training sequence is transmitted if there is no data to transmit, and if the dummy burst cannot be confused with a regular traffic burst according to the current channel state. The dummy burst contains no intelligible information to mobile terminals.

23 Claims, 3 Drawing Sheets

U.S. PATENT DOCUMENTS 6,799,023 B2 * 9/2004 Pinola et al. ............. 455/234.1
7,085,248 B1 * 8/2006 Holma et al. ............... 370/329

OTHER PUBLICATIONS

PCT International Preliminary Report on Patentability, completed Nov. 8, 2005, in connection with International Application No. PCT/SE2003/002011.

Craig, S. et al.: "Efficient broadcast frequency utilization—a key to high capacity cellular networks" IEEE 58th Vehicular Technology Conference, 2003. VTC 2003-Fall, Oct. 6-9, 2003, vol. 2, pp. 917-921, ISSN 1090-3038.

Chinese Office Action, dated Mar. 13, 2009, in connection with Chinese Patent Application No. 200380110864.9.

* cited by examiner

METHOD AND APPARATUS FOR DETERMINING THE CONTENT OF BURSTS TO BE TRANSMITTED FROM A BASE STATION

TECHNICAL FIELD

The present invention relates generally to a method and apparatus for determining the content of bursts to be transmitted on a broadcast frequency from a base station. In particular, the invention is intended to enable accurate identification of a base station when measuring a received signal, and to avoid burst confusion.

BACKGROUND OF THE INVENTION AND PRIOR ART

A mobile communication network includes a plurality of base stations being connected together by means of switching nodes, such as Base Station Controllers (BSC), Mobile Switching Centres (MSC), and Serving GPRS (General Packet Radio Service) Support Nodes (SGSN). Each base station provides radio coverage over an area known as a cell, for radio communication with mobile terminals located therein. The mobile network has been allowed to use a certain limited radio frequency spectrum for transmissions between base stations and mobile terminals. Thus, data is transmitted over various logical channels on physical frequency channels within the allocated spectrum.

In a typical cellular network configuration, each cell is allocated a number of specified physical frequency channels to be used for call connections and for broadcasting information to mobile terminals. Since the total number of available physical frequency channels is limited, they must be reused to some extent in plural cells throughout the network. However, frequency channels can only be reused in cells being sufficiently distant from each other, as to not interfere too much with each other, although mobile terminals and base stations are adapted to cope with a certain extent of interference.

Cell planners are concerned with allocating frequencies to the cells in networks where certain reuse patterns are employed, which is generally well-known in the art. Great efforts are made to be able to employ tight reuse patterns, i.e., with as short reuse distances as possible, in order to maximize the traffic capacity in the network. An important factor to consider is to keep transmission power levels for calls and broadcasts as low as possible, without jeopardising the radio coverage, in order to reduce the amount of interference, which will in turn enable short reuse distances. Highly accurate power control mechanisms for ongoing calls have therefore been developed.

Another area of interest is the selection of the most appropriate base station for connection with a mobile terminal. For example, if a mobile terminal being connected to a serving base station moves away from that base station towards a neighbouring base station, the received signal strength or link quality of the old base station will decrease and that of the new base station will increase. As a result, the new base station may become more suitable for connection, requiring less transmission power to achieve acceptable link quality.

There are various known mechanisms for switching connection from a serving base station to a new one, referred to as "handover" or "handoff" when the terminal is in busy mode, i.e., engaged in a call, and "cell selection" or "cell reselection" when in idle mode, i.e., not engaged in a call but powered-on. Switching of serving base station may also be performed for mobile terminals being in a packet-switched transfer mode (in contrast to circuit-switched communication). For either mode, this will hereafter be referred to as "base station selection" for simplicity. Hence, correct base station selections will result in low interference and make tight reuse patterns possible, as well as saving battery consumption in the terminals.

In most cellular networks of today, mobile terminals are required to make measurements on signals from neighbouring base stations as well as from the serving base station, and to report the measurement results to the serving base station. Reported measurements can then be used by the network for different purposes, such as:

1) Supporting the process of selecting the most appropriate base station for a specific connection, as discussed above. The reported measurements on signals from neighbouring base stations, as well as from the serving base station, are compared, and the "best" base station is selected for connection, preferably after some predefined threshold condition also has been fulfilled. In the case of handover in busy mode, these measurements are often referred to as MAHO (Mobile Assisted Handover) measurements.

2) Supporting mechanisms for determining the position of the terminal (generally called "positioning"), requiring timing and/or signal strength information of received signals from each target base station. The terminal can measure and report the reception delay and/or signal strength of signals from preferably at least three base stations. From this information and by the known location of each base station, the current position of the terminal can be calculated.

3) Characterising network properties, such as calculating cell relations and evaluating different cell patterns or plans and various algorithms and parameters that are used for operating the network. Various measurements of link quality from different base stations can form a basis for network planning and network configuration work. Cell relations include, e.g., an estimated level of interference if the cells are allocated the same or adjacent frequency channels for transmissions. Typical network planning tasks include: setting cell patterns and transmission power levels, making antenna adjustments and setting frequency allocation parameters and handover thresholds.

From the above, it is evidently desirable that mobile terminals can make accurate and reliable measurements on signals transmitted from different base stations. The impact of reported inaccurate or misleading measurements can thus affect the above-mentioned activities adversely.

In order to enable such measurements, each base station continuously transmits a signal at a fixed power level on at least one broadcast frequency or pilot channel, which in GSM is called the BCCH (Broadcast Control Channel) frequency. Mobile terminals present in the network can then make measurements on the broadcasted signal with respect to, e.g., link quality or timing estimation.

As is well-known, a broadcast frequency includes successive signal bursts transmitted in timeslots. A plurality of logical channels are multiplexed onto the physical broadcast frequency according to a specific TDMA (Time Division Multiple Access) frame structure. The logical channels may include point-to-multipoint channels such as paging channels PCHs, a frequency correction channel (FCCH), a synchronisation channel (SCH), as well as other specific control channels. The logical channels may also include dedicated point-to-point traffic channels (TCH), which can be used for mobile terminal connections, and point-to-point signalling channels, e.g. a Stand alone Dedicated Control Channel (SDCCH).

When a mobile terminal connects to a certain base station, that base station will transmit a measurement order including a list of broadcast channels transmitted by neighbour base stations to be measured by the terminal. Such a neighbour list may be pre-defined for each cell, at least for the purpose of MAHO measurements, and indicates the broadcast frequency of each target base station and possibly also the identity of the base station. The number of base stations included in a neighbour list is typically in the range of 10-32, depending on cell configurations in the network.

Figure 1:
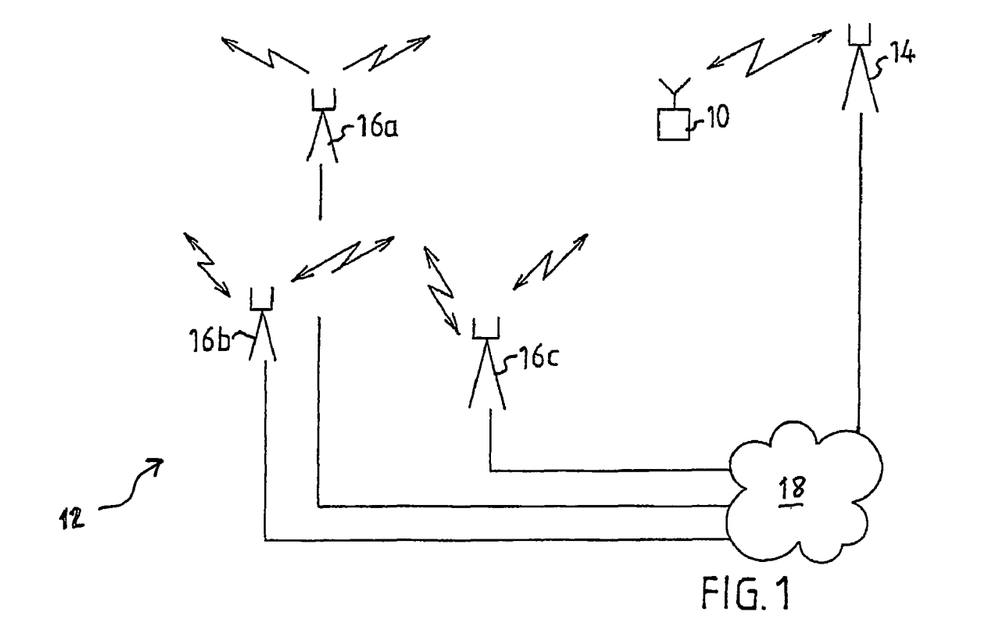
FIG. 1 is a schematic view of a mobile communication network where measurements on neighbouring base stations are performed.

To illustrate this measuring procedure, FIG. 1 shows a schematic view of a mobile terminal 10 operating in a cellular communication network 12, including a plurality of base stations 14, 16a-c interconnected by means of a switching network 18. In this case, the terminal 10 is currently connected to a serving base station 14. Initially, when the terminal 10 starts the connection with the serving base station 14, the terminal 10 receives from the network, by means of the base station 14, a measurement order including a neighbour list with the broadcast frequencies (and optionally also identities) of a plurality of predetermined neighbouring base stations, of which three are shown, 16a-c. The terminal 10 is thereby ordered by the network to perform measurements, e.g. with respect to link quality or timing, on the specified broadcast frequencies during idle periods, and to send one or more reports to the serving base station 14 and the network. Such reports may be sent in response to polling from the network, or according to a predetermined schedule either specified by the standard used, or by the measurement order that was sent from the network.

Alternatively, the terminal 10 may as yet be unconnected to any serving base station, like for example when the terminal 10 has just been powered on. The terminal then scans for broadcast frequencies and measures them in order to register with a base station having the strongest/best signal.

As mentioned above, mobile terminals may measure broadcasted signals with respect to link quality or timing. Link quality may be measured as at least one of: a received signal strength (RSS), a carrier-to-interference power ratio (C/I), a carrier power, a Bit Error Rate (BER) or any other link quality related parameter. Timing may be measured by detecting a burst offset in relation to a given clock reference provided from the serving base station. However, the present invention is not limited to any particular measuring methods or schedules.

However, due to the above-mentioned co-channel interference problems, measurement errors may occur if the frequency reuse distances are relatively short. The terminal may for example erroneously measure a strong signal from a base station not being an intended target base station but reusing the same broadcast frequency. Furthermore, the measured signal is typically the sum of plural signals transmitted from several sources reusing the same frequency, including their reflections, and the total measured signal strength and/or quality may therefore be misleading.

In some networks, it is therefore required that the terminal must qualify a measurement by verifying the target base station being measured, before reporting the measurement to the serving base station. By ascribing a certain measurement to a certain base station, that measurement will be more reliable, whereas if the terminal fails to identify the base station, the measurement should be discarded.

In WO 02/096149, a solution is disclosed for mobile terminals to accurately ascribe measurements to specific base stations. The measurements are qualified only when their identity can be determined based on the same received signal being measured.

In order to enable identification of base stations, it has been proposed to include in the broadcasted signal from each base station an indication of that base station's identity which the terminal can read, or at least detect. Base station identification is typically further helped by the terminal knowing, from the received neighbour list, which target base station to expect for each measured frequency. In GSM, a base station identity is used called the Base Station Identity Code (BSIC), which is included in the SCH. The BSIC comprises a Network Colour Code (NCC) and a Base station Colour Code (BCC). Furthermore, normal bursts transmitted on the BCCH frequency may contain information which is related to the BSIC, such that the receiving terminal can derive the BSIC therefrom.

In general, transmitted signals have been more or less corrupted during their propagation, when received by the terminal. A process called channel estimation is therefore typically used by the terminal receiver to recover the transmitted signal. Channel estimation utilizes a training bit sequence known to the terminal, which in the GSM case is 26 bits long, typically embedded in all normal bursts transmitted from base stations, including bursts in the broadcast channel. Exceptions from "normal" bursts may be the FCCH burst which only contains a sinus wave for frequency synchronisation, and the SCH burst which contains a longer specific training sequence used for initial TDMA burst synchronisation. There are numerous known techniques for channel estimation available, which will not be described here further. In timeslots where there is no useful information to transmit, so-called "dummy bursts" containing no data are transmitted, in order to maintain the required continuous transmission on the BCCH frequency.

Figure 2:
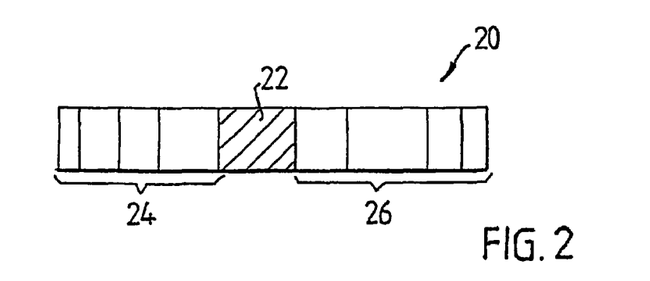
FIG. 2 is a schematic illustration of an exemplary normal burst.

FIG. 2 illustrates schematically an exemplary normal burst 20 transmitted in a timeslot of a broadcast frequency channel from a target base station included in the neighbour list received by the terminal. The normal burst 20 may belong to any one of many possible logical channels, e.g. a traffic burst belonging to a traffic channel, and includes a bit field 22 with a training sequence, often arranged approximately in the middle of the burst. The burst 20 may further include various fields placed on both sides 24, 26 of the training sequence, such as a header field, fields with payload or control data, tail bit fields etc.

The training sequence in a normal burst from a serving base station is known by the terminal, and is used to facilitate synchronisation and the decoding or detection of the burst. A set of known training sequences have typically been defined, e.g., eight different sequences in GSM, and the one used in a particular burst is identified by a Training Sequence Code (TSC) of, e.g., 3 bits. In a GSM common control channel, the TSC is identical to the BCC, and for other channels, the TSC is communicated in channel assignment messages to the terminal.

According to WO 02/096149, the base station identity is preferably related to the TSC in a way that is known in advance by mobile terminals, by applying "base station specific" training sequences. A mobile terminal receiving a normal burst from a target base station can therefore determine the base station identity, regardless of which logical channel the received burst belongs to, by detecting an expected training sequence in the burst and deriving the TSC therefrom. In the simplest case, the base station identity, such as the BCC in GSM, is set to be identical with the TSC. However, other relationships are possible.

In WO 02/096149, it is further proposed that channel estimation is conducted for measured signals from neighbouring base stations, in order to verify the target base station. Moreover, channel estimation may be conducted for several candidate training sequences, in order to separate contributions from plural base stations reusing the same frequency, as well as any reflections thereof. This procedure will facilitate detection of the target base station, which is described in more detail in WO 02/096149.

In some mobile networks, different modulation methods are used for conveying data bits in the bursts. In networks using EDGE (Enhanced Data rates for GSM/TDMA136 Evolution) technology, i.e. GERAN (GSM/EDGE Radio Access Network), two different modulations are used, namely GMSK (Gaussian Minimum Shift Keying) using two phase positions in each symbol to represent one bit (1 or 0), and 8PSK (8-ary Phase Shift Keying) using eight phase positions in each symbol to represent three bits (1 or 0 each). In GERAN, eight different training sequences with corresponding TSCs have been defined for each modulation form, where each TSC is coupled to one GMSK training sequence and to one 8PSK training sequence, respectively. These training sequences/TSCs have also been stored in mobile terminals capable of operating in GERAN.

Base stations reusing the same broadcast frequency can have different BCCs, and by coupling the TSCs to the BCCs, the training sequences will be different as long as the BCCs are different. This is the case, e.g., in GERAN base stations supporting a positioning technique called Enhanced Observed Time Difference (E-OTD). Hence, if a mobile terminal can recognize the training sequence included in a received burst, the sending base station can be identified from the TSC/BCC derived from that training sequence. Here, the terminal may make an estimation attempt for each possible modulation form on the same received signal, likewise described further in WO 02/096149. However, synchronisation bursts, frequency correction bursts and dummy bursts on the broadcast frequency have no base station specific training sequences, but all other logical channel bursts should contain one of the above-described base station specific training sequences.

At least for measurements intended for base station selection purposes, it is important that each base station continuously transmit on the broadcast frequency, even in timeslots that are currently unused (i.e. where there is no data to transmit), to enable measurements at any time. Unused timeslots may occur in the broadcast frequency frame structure, e.g., when there are unoccupied traffic channels due to low traffic load, or when so-called discontinuous transmission (DTX) is currently applied for an occupied traffic channel, which is a well-known algorithm for minimising interference. In DTX, no data is transmitted when not necessary, e.g. due to silence at the sender side. In cellular networks, it is a general practice to transmit dummy bursts on broadcast frequency channels in unused timeslots, as mentioned above, in order to maintain continuous transmission.

Normally, a "traditional" dummy burst carries no intelligible information, and a predetermined and fixed bit pattern is typically transmitted in all dummy bursts, easily recognizable to mobile terminals. Therefore, it is not possible to determine any base station identity from such dummy bursts, which may sometimes occur quite frequently. Synchronisation bursts and frequency correction bursts occur at fixed frame positions known by mobile terminals, but the occurrence of dummy bursts is more or less unpredictable to them. Moreover, the fixed bit pattern in the entire burst requires special treatment by mobile terminals, since the normal training sequence is not included as expected. Hence, the occurrence of dummy bursts have rendered measurements on neighbouring base stations more difficult.

To overcome these problems, it has been proposed to include in dummy bursts transmitted over broadcast frequency channels, an indication of the base station identity, such as a training sequence which is related to the base station identity in a known way. This will therefore significantly increase the possibilities for mobile terminals to determine the identity of the neighbouring base station having sent a received dummy burst, and to make successful measurements to support, e.g., base station selection and positioning activities.

If a known base station specific training sequence is included in a received dummy burst, the terminal can use it to identify the base station as well as to, e.g. in E-OTD, estimate the timing offset to the corresponding base station, or better estimate the link quality of the burst.

Even though dummy bursts with base station specific training sequences would enable identification of neighbouring base stations, another problem will arise in that the dummy bursts could be erroneously interpreted by mobile terminals as their regular traffic bursts in some situations. For example, if a mobile terminal is active in a call, but the used downlink traffic channel is currently in DTX mode, i.e. the corresponding time slots are unused, the base station must transmit dummy bursts instead to satisfy the continuous broadcasting requirement. Mobile terminals can easily distinguish normal traffic bursts from the traditional dummy bursts with their specific bit pattern, which has very low cross correlation with the training sequences in regular traffic bursts, and correctly interpret such dummy bursts as a continued DTX mode. On the other hand, if a transmitted dummy burst would include a base station specific training sequence instead, it could potentially be erroneously interpreted by the terminal as a regular traffic burst having the same training sequence.

If one or more such dummy bursts are interpreted as traffic bursts, the terminal may erroneously believe that the DTX mode is finished and that a speech frame has been received. In that case, the terminal will attempt to decode the error correcting code of the supposed speech frame. Further, it will attempt to decode an error detecting code (also known as a Cyclic Redundancy Check (CRC) code) of the speech frame, to check whether it is a valid speech frame. Although the error detecting code in most cases gives a correct indication of whether a speech frame is valid or not, it is still possible that an invalid frame is incorrectly deemed to be valid. The probability that an invalid speech frame is interpreted as valid depends on the number of bits used for the CRC. Typically, this probability decreases exponentially with an increasing number of CRC bits. If an invalid speech frame is delivered to the speech decoder in the terminal, this results in unwanted noise. This problem is especially relevant for the TCH/FS (Traffic Channel/Full rate Speech) and TCH/HS (Traffic Channel/Half rate Speech) channels, carrying speech frames adapted to the early speech codecs of GSM, where only three CRC bits are used. A three bit CRC means that approximately ⅛-th of the invalid frames are interpreted as valid by the CRC.

The potential problem of misinterpreting traffic bursts would most likely supersede the benefits gained for the identification and measuring activities, and therefore has to be taken into account when introducing dummy bursts with base station specific training sequences.

To conclude, it is of great importance to obtain reliable measurements on neighbour base stations with high accuracy, and to minimise the delay time between such measurements and corresponding reports, in order to improve procedures of base station selection, position determination and network evaluation. At the same time, it is desirable to avoid, as far as possible, the risk of misinterpretation of different bursts received by mobile terminals. It is also desirable to reduce the impact of interference on the measurement accuracy, thereby allowing for a tighter frequency reuse.

SUMMARY OF THE INVENTION

The object of this invention is to reduce or eliminate the problems outlined above. It is an object to determine the content in bursts to be transmitted from a base station in a mobile network on a broadcast frequency, such that the risk of burst confusion for connected terminals is minimised, at the same time burst detection for measuring terminals is facilitated maximally. It is another object to determine the burst content such that when dummy bursts are transmitted, mobile terminals can identify the transmitting base station. It is another object to reduce interference in the network, as well as the impact of interference on the measurement accuracy, thereby allowing for a tighter frequency reuse in the network.

These objects and others are obtained by providing a method and apparatus for determining the content in bursts to be transmitted from a base station in a mobile network on a broadcast frequency in specific timeslots of a broadcast frequency frame structure, wherein a logical channel is allocated to each timeslot. Information is first received on a forthcoming burst to be transmitted, and a current state is checked of the logical channel allocated to the forthcoming burst. The content in the forthcoming burst is then determined depending on the current channel state, such that a dummy burst with a base station specific training sequence is transmitted if there is no data to transmit, and if the dummy burst cannot be confused with a regular traffic burst according to the current channel state. The dummy burst to be transmitted has data fields containing no intelligible information to mobile terminals.

A dummy burst with a base station specific training sequence may be transmitted if the channel is not occupied, wherein no connected mobile terminal is listening to the channel. If at least two different modulation forms, including GMSK modulation, can be used for the broadcast frequency, the dummy burst may be a GMSK modulated dummy burst. The transmitted dummy burst may belong to a dummy frame in the form of a fill frame generated at a higher layer in the network, such as a Layer 2 fill frame.

If only a single modulation form can be used for the broadcast frequency, a dummy burst with a common fixed bit pattern may be transmitted, if the channel is occupied but there is no data to transmit. On the other hand, if at least two different modulation forms can be used for the broadcast frequency, a dummy burst with a base station specific training sequence may be transmitted using a modulation form other than the one currently used for the allocated logical channel, if the channel is occupied but there is no data to transmit. If GMSK modulation and 8PSK modulation can be used for the broadcast channel, a GMSK modulated dummy burst may be transmitted, if 8PSK modulation is currently used for the logical channel, or vice versa.

When a dummy burst is to be transmitted having a base station specific training sequence, the transmitted dummy burst may include a fixed bit pattern located in the burst on at least one side of the base station specific training sequence. Preferably, the fixed bit pattern has, at least partly, a low cross correlation to all possible training sequences defined in the network. The transmitted dummy burst may further include a fixed bit pattern located in the burst on at least one side of the base station specific training sequence, wherein the fixed bit pattern is related to that training sequence in a known manner. If at least two different modulation forms can be used for the broadcast frequency, the fixed bit pattern may be different for the different modulation forms.

For systems using DTX, any DTX mode may further be disabled for logical channels not applying frequency hopping with the broadcast frequency included in the hopping scheme, such that regular traffic bursts are transmitted even during silent periods.

BRIEF DESCRIPTION OF THE DRAWINGS

The present invention will now be described in more detail and with reference to the accompanying drawings, in which.

DESCRIPTION OF PREFERRED EMBODIMENTS

Figure 3:
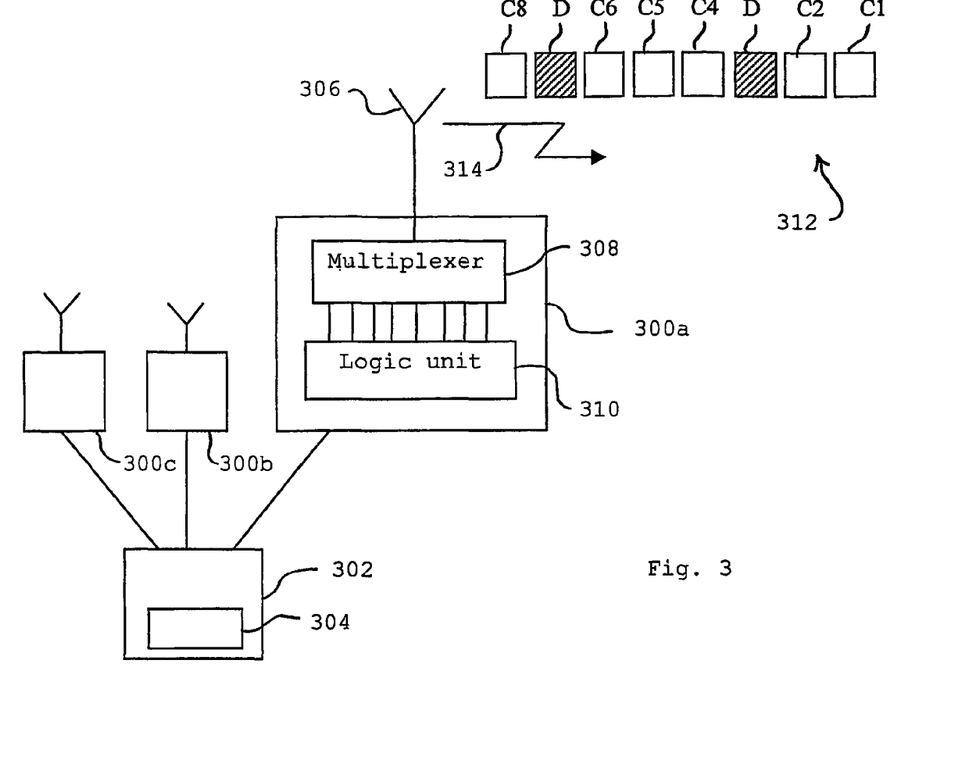
FIG. 3 is a schematic illustration of a mobile network including a base station transmitting bursts, which can be determined in accordance with the invention.

In FIG. 3, three base stations 300a, 300b and 300c are shown belonging to a mobile network (not shown), where the base stations 300a-c are all connected to a base station control node 302, such as a BSC in GSM, which is adapted to control transmissions from the base stations 300a-c by means of a logic unit 304. In the figure, base station 300a is schematically illustrated in more detail, comprising an antenna 306, a multiplexer 308 and a logic unit 310.

The base station is adapted to continuously transmit bursts 312 on a broadcast frequency carrier 314 in successive timeslots according to a TDMA frame structure, of which only a small part is indicated in the figure. For example in GSM, the multi-frame structures for the BCCH frequency define how the logical channels are mapped onto the physical channels. The logic unit 310 in that base station 300a, or alternatively the logic unit 304 in the control node 302, or both, may determine the content in bursts to be transmitted from the base station 300a.

The base stations are of course further equipped with many other necessary components, such as transceivers, filters etc., although not shown here for simplicity. Moreover, the base stations may also transmit from their antennas further physical channels on other carrier frequencies than the broadcast frequency, by using a combiner etc., according to well-known techniques which are not described here further.

The timeslots in each TDMA frame are associated with specific logical channels C1, C2, C3 ... which can be any type of channels transmitted on a broadcast frequency. The logic unit 310 receives information, not shown, on what is to be transmitted in the respective logical channels, and accordingly creates bit patterns to be transmitted in successive timeslots. The created bit patterns are then fed to the multiplexer 308 for sequential transmission as bursts from the antenna 306 according to the given multi-frame structure of the broadcast channel. If the logic unit 310 receives no data to transmit, a dummy burst may be created and transmitted, which will be described in more detail below. Hence in this concept, the logic unit will also be informed (in GSM, by the BSC) whenever there is no data to transmit.

In the illustrated example, the base station 300a transmits data in channels C1 and C2 as "normal" bursts, i.e. containing some sort of received data. However, no data is to be sent in the channel allocated to the next timeslot and a dummy burst D is transmitted instead. Next, channels C4, C5 and C6 require that data is sent in their respective timeslots, but a dummy burst D is transmitted in the next timeslot due to lack of data to send, and so forth. As mentioned in the background section, the transmission of traditional dummy bursts with a common fixed bit pattern may cause problems in some situations, which the present invention is intended to avoid.

The present invention is directed to a solution where the content in a burst to be transmitted, of a specific logical channel, is determined depending on the current state of that logical channel. In particular, dummy bursts are transmitted in a way that they cannot be confused with regular traffic bursts. In the context of the present invention, a "dummy burst" may be any type of burst with data fields containing no intelligible or meaningful data to mobile terminals.

Figure 4:
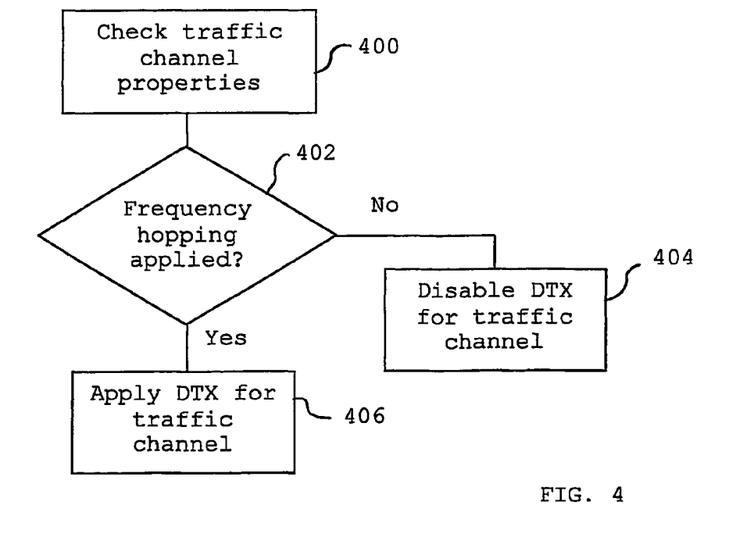
FIG. 4 is a flow chart illustrating the steps executed in a procedure for deciding whether to use DTX for a traffic channel.

As discussed above, the use of DTX may give rise to burst confusion in certain situations. When a logical channel is occupied but its timeslots are currently unused, meaning that a mobile terminal is connected but there is currently no data to transmit, a DTX mode is normally applied. Applying the DTX mode may be decided anywhere in the transmission path depending on the implementation, but it is most typically decided by a network node controlling base stations, such as the BSC in GSM systems. During DTX, the connected terminal is listening to a particular timeslot in the frame structure allocated to the traffic channel, in order to detect when regular traffic bursts interrupt the DTX mode. Generally speaking, DTX would not have any interference saving effect if frequency hopping is not applied to the broadcast frequency, i.e. when the traffic channel is transmitted only on the broadcast frequency, due to the continuous transmission requirement for that frequency. However, if frequency hopping is applied, a DTX mode would reduce the interference for the other frequencies used in the hopping scheme. Therefore, the following procedure illustrated in FIG. 4 is preferably executed in order to minimise interference.

In a first step 400, the properties of a specific traffic channel transmitted on the broadcast frequency are checked with respect to frequency hopping. In a next step 402, it is determined whether frequency hopping is applied for that channel. If not, any DTX mode is disabled, or simply not applied, for that channel due to the continuous transmission requirement, in a step 404. As a result, regular traffic bursts will be transmitted in unused timeslots, i.e. when there is no data to send. In a speech call, such a transmitted traffic burst could contain data describing silence, optionally including some "comfort noise", instead of using DTX. This data will be decoded by the receiver and the perceived effect will be the same to the user of the receiving terminal anyway, since in DTX a comfort noise in typically generated locally in the terminal, often based on received noise parameters, which is well-known in the art. As mentioned above, DTX cannot be used for the broadcast frequency to reduce interference due to the continuous transmission requirement, so there is no disadvantage in disabling the DTX mode to transmit a regular traffic burst in this situation.

On the other hand, if frequency hopping is applied for that traffic channel, DTX can advantageously be applied in a step 406, since that would reduce the interference for the other frequencies used in the hopping scheme. However, dummy bursts are transmitted instead on the broadcast frequency for that channel in unused timeslots, i.e. during DTX periods, which will be described below.

Figure 5:
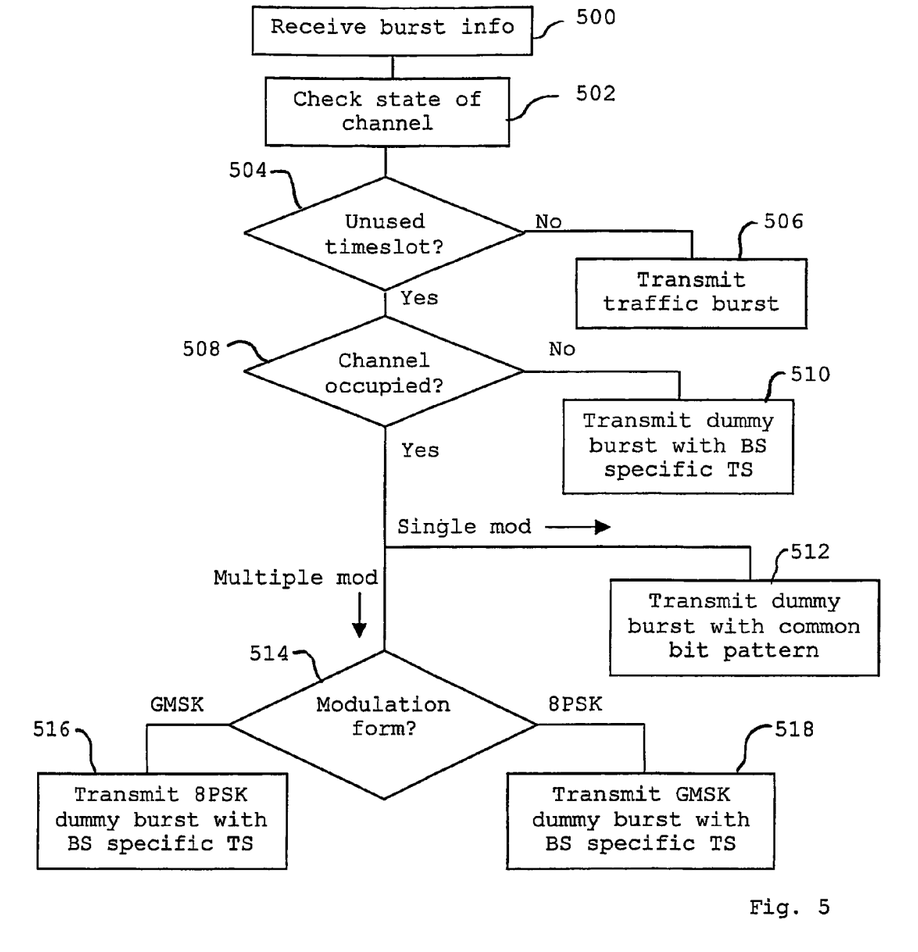
FIG. 5 is a flow chart illustrating the steps executed in a procedure for determining the content of bursts to be transmitted, in accordance with the invention.

FIG. 5 is a flow chart illustrating a procedure of determining the content in bursts to be transmitted from a base station, which is valid for base stations configured to either use a single modulation form for the broadcast channel, e.g. GMSK as in traditional GSM networks, or multiple modulation forms, in this case GMSK and 8PSK as in GERAN.

The procedure of FIG. 5 is executed each time a traffic channel burst is to be transmitted. In this example, other logical channels are disregarded, such as various point-to-point or point-to-multipoint control channels. In a first step 500, information is received, e.g. in logic unit 310 or 304 of FIG. 3, regarding what data is to be sent, if any, in a next traffic channel burst. This could be specific payload or control data to be transmitted, or an indication that there is no data to transmit. In a next step 502, the state of the traffic channel allocated to the forthcoming burst is checked. In the following procedure, the burst content is dependent on the current channel state, as will be described below.

After step 502, it is determined in a step 504 whether the timeslot is unused or not. If it is currently used and there is data to transmit to a connected mobile terminal listening to that particular timeslot in the frame structure, a regular traffic burst is naturally transmitted containing the required data, in a step 506. Of course, all regular traffic bursts include a base station specific training sequence, as shown in FIG. 2, enabling proper identification of the base station.

If it is determined in step 504 that the timeslot is unused, it is determined in a next step 508 whether the present channel is currently occupied by an ongoing connection or not. If it is not occupied, a dummy burst having a base station (BS) specific training sequence (TS) is transmitted in the timeslot, in a step 510. Since the channel is unoccupied, no connected terminal is currently listening to that particular timeslot in the frame structure, and therefore such a dummy burst with the base station specific training sequence cannot be mistaken for being a regular traffic burst by any terminal.

In practice, the transmission of dummy bursts in unoccupied timeslots may also be realised by generating dummy frames in the form of fill frames, at higher layers in the network. These fill frames can typically have the same format as the frames of normal speech or control channels, and are therefore treated as such by the base station. To a base station, a fill frame for a speech channel would appear to be a normal speech frame, and therefore the corresponding dummy bursts would look like any normal traffic bursts with base station specific training sequences. The data in these frames, however, would be neither directed to, nor detected by, any particular mobile terminal. An example of such fill frames are the "Layer 2 fill frames", which in GSM are transmitted in unoccupied signalling blocks on the BCCH channel and Common Control Channel (CCCH).

If the base station is configured to use both GMSK modulation and 8PSK modulation, the dummy burst of step 510 is preferably GMSK modulated to further facilitate burst detection for any measuring terminals. For neighbour cell measurement purposes, GMSK modulation is generally to be preferred over 8PSK modulation for the following reasons. 8PSK modulated signals have a higher peak-to-average power than GMSK modulated signals, which means that the maximum power supported by the base station is typically lower for the 8PSK modulated signals. Depending on the nominal output power setting for the cell, 8PSK modulated signals may be transmitted with a reduced average power, resulting in greater uncertainties for link quality and timing measurements, as compared to GMSK. In addition, if an interference rejection algorithm, such as the SAIC (Single Antenna Interference Cancellation, defined in 3GPP TSG GERAN, GP-022891, Work Item for Single Antenna Interference Cancellation, November 2002), is used by connected terminals, a larger gain is generally provided for GMSK interference than for 8PSK interference. Also, the constant envelope properties of the GMSK modulated signals could be utilised to further improve robustness towards interference, which cannot readily be done for 8PSK modulated signals, since they do not possess such properties.

If is determined in step 508 that the present channel is occupied, the following steps will depend on whether the base station is configured to use a single modulation form for the broadcast channel (arrow to the right), or multiple modulation forms, in this case GMSK and 8PSK (arrow downwards).

When a single modulation form is used, a dummy burst with a common fixed bit pattern, i.e. no base station specific training sequence, should be transmitted in a next step 512, such as the previously used traditional dummy burst. The risk of burst confusion with a regular traffic burst by the connected mobile terminal is then avoided. Moreover, when frequency hopping is applied for the traffic channel, DTX can safely be used for this traffic channel in other non-broadcast frequencies included in the hopping scheme, to reduce interference, as decided in step 406 of FIG. 4, since the dummy burst is transmitted anyway regardless of DTX on the broadcast frequency.

It should be noted that in this case (step 512), no dummy burst with a base station specific training sequence should be transmitted, since there is a risk that such a burst could be mistaken as a regular traffic burst by the connected mobile terminal occupying the channel.

If the base station is configured to use multiple modulation forms, it is determined in the next step 514, after step 508, which one of two different modulation forms is used for the present traffic channel. In this example, the base station is configured to use both GMSK and 8PSK modulation, such as EDGE-capable base stations in GERAN. 8PSK provides a higher bit rate with three bits per symbol as compared with one bit per symbol in GMSK, but 8PSK modulated bursts are more sensitive to background interference and noise, and therefore put higher demands on the link quality. Hence, the network is free to select the most appropriate modulation form for a session depending on link quality and bandwidth requirements of the session. The modulation form may further be switched dynamically during an ongoing session if the situation changes. It should be noted that the present invention is not limited to any particular types or number of modulation forms, or network types.

For base stations using a single modulation form (arrow to the right), a dummy burst with a common fixed bit pattern was transmitted in step 512 in order to avoid burst confusion, although at the cost of making neighbour measurements on that burst more difficult, as explained above. However, if different modulation forms can be used (arrow downwards) it is possible to transmit dummy burst with a base station specific training sequence, and still avoid burst confusion, in the following manner.

After step 508, it is checked which modulation form is currently applied to the present channel, in step 514. If GMSK modulation is currently applied, a dummy burst with a base station specific training sequence is transmitted in a step 516, using 8PSK modulation. On the other hand, if 8PSK modulation is currently applied, a dummy burst with a base station specific training sequence is transmitted in a step 518, using GMSK modulation. By transmitting such dummy bursts using another modulation form than the one currently applied, the confusion risk is minimised for the connected mobile terminal, since the cross correlation between training sequences of the two modulation forms is very low. Hence, the connected mobile terminal will not interpret, e.g., a GMSK dummy burst as an 8PSK traffic burst, or vice versa, even if the training sequence code (TSC) is the same, since the training sequences are in fact different in the different modulations.

Generally speaking, a dummy burst with a base station specific training sequence is transmitted using a modulation form other than the one currently used for the allocated logical channel. In some specific cases, it may however be preferable to transmit 8PSK modulated dummy bursts for logical channels otherwise using GMSK modulation, but not the other way round.

After the burst has been prepared for transmission in the above-described manner, the process can be repeated by returning to step 500, to handle the next forthcoming traffic burst to be transmitted, and so forth.

In the cases where dummy bursts with base station specific training sequences are to be transmitted, as in the above steps 510, 516 and 518, the results mentioned above can be further improved by selecting suitable bit patterns before and after the actual training sequence in the burst.

Figure 6:
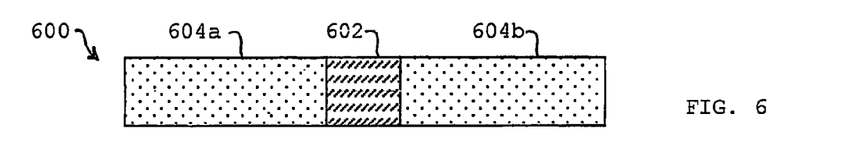
FIG. 6 is a schematic illustration of a dummy burst according to one embodiment.

FIG. 6 illustrates schematically one embodiment of a dummy burst 600 having a base station specific training sequence 602 approximately in the middle of the burst, although in practice it may be located anywhere in the burst. On either side of the training sequence 602, a fixed bit pattern 604*a* and 604*b*, respectively, is included. At least one of the two patterns, preferably both, has a low cross correlation, i.e. low similarity, to all possible training sequences used in the network (eight per modulation form in the case of GSM/GERAN), including the present one 602 which is specific for the transmitting base station. Thereby, the risk is minimised that these parts of the burst are erroneously interpreted as a training sequence by mobile terminals, either connected or just measuring. Alternatively, the burst may include such a fixed bit pattern located on only one side of the base station specific training sequence.

Figure 7:
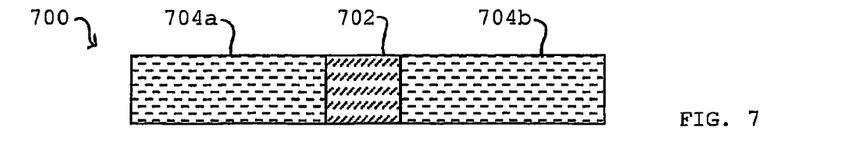
FIG. 7 is a schematic illustration of a dummy burst according to another embodiment.

FIG. 7 illustrates schematically another embodiment of a dummy burst 700 likewise having a base station specific training sequence 702 approximately in the middle of the burst. In this case, a fixed bit pattern 704*a* and 704*b*, respectively, is included on either side of the training sequence 702, which are both related to that specific training sequence in a known manner. Hence, these bit patterns 704*a*, 704*b* are also base station specific and will be known to mobile terminals, such that a receiving terminal can more or less utilise the entire dummy burst to detect and identify the base station, and also to measure the link quality and to make a timing measurement, if needed. Thereby, the chance of correct burst detection will be increased further.

The base station specific bit patterns 704*a*, 704*b* have preferably a relatively low cross correlation to all possible training sequences defined in the network, or at least to the present one 702. As in the previous example, a fixed bit pattern may alternatively be located on only one side of the base station specific training sequence 702. Furthermore, synchronisation over an entire dummy burst may be simplified if also the auto correlation property of the entire dummy burst is taken into account when designing the fixed bit patterns in the data fields.

If at least two modulation forms are used for the broadcast frequency, the fixed bit pattern 604*a*, 604*b*, 704*a* and 704*b*, respectively, is preferably different for the different modulation forms.

In the above-described examples of transmission strategies and burst structures, the risk of burst confusion for connected terminals is minimised, at the same time burst detection for measuring terminals is facilitated maximally. More specifically, bursts with base station specific training sequences are transmitted as far as possible without introducing confusion risks. This is beneficial for the burst detection in mobile terminals, which enables good reception quality (e.g. speech quality), as well as reliable measurements and base station identifications. Being able to correctly identify base stations, or at least distinguish between different base stations, is particularly important when a relatively tight reuse pattern is employed in a cellular mobile network where several relevant base stations use the same broadcast frequency. Signals received by measuring terminals will then typically contain contributions from more than one base station.

Using bursts with base station specific training sequences will thus facilitate measurements, since the receiving terminal only needs to receive the burst during the training sequence interval (although some additional symbols may be desirable), in contrast to the entire burst, in order to obtain a correct synchronisation. Timing estimations will then be successful more often, for the purpose of positioning measurements. In the traditional dummy bursts with a common fixed bit pattern, the entire burst must be detected in order to obtain correct synchronisation due to its poor auto-correlation properties.

The present invention may be implemented in a computer program product, either directly loadable into the internal memory of a computer, or stored on a computer usable medium. The apparatus for performing the inventive method by means of running said computer program may be located in a base station and/or in a network node controlling plural base stations. Thus, the "intelligence" for determining the content in bursts to be transmitted from a base station in a mobile network may be placed in that base station or in another network node, such as a BSC, or may be distributed in both.

While the invention has been described with reference to specific exemplary embodiments, the description is only intended to illustrate the inventive concept and should not be taken as limiting the scope of the invention. Various alternatives, modifications and equivalents may be used without departing from the spirit of the invention, which is defined by the appended claims.

The invention claimed is:

1. A method of determining the content in bursts to be transmitted from a base station in a mobile network on a broadcast frequency in specific timeslots of a broadcast frequency frame structure, wherein a logical channel is allocated to each timeslot, comprising the following steps:
   receiving information on a forthcoming burst to be transmitted;
   checking a current state of the logical channel allocated to the forthcoming burst; and
   determining the content in the forthcoming burst depending on the current channel state, wherein a dummy burst with a base station specific training sequence is transmitted if there is no data to transmit, and if the dummy burst cannot be confused with a regular traffic burst according to the current channel state, said dummy burst having data fields containing no intelligible information to mobile terminals.

2. A method according to claim 1, wherein a dummy burst with a base station specific training sequence is transmitted if the channel is not occupied, wherein no connected mobile terminal is listening to the channel.

3. A method according to claim 2, wherein:
   at least two different modulation forms, including GMSK modulation, can be used for the broadcast frequency; and
   the dummy burst is a GMSK modulated dummy burst.

4. A method according to claim 2, wherein the transmitted dummy burst belongs to a dummy frame in the form of a fill frame generated at a higher layer in the network, such as a Layer 2 fill frame.

5. A method according to claim 1, wherein:
   a single modulation form can be used for the broadcast frequency; and
   a dummy burst with a common fixed bit pattern is transmitted, if the channel is occupied but there is no data to transmit.

6. A method according to claim 1, wherein:
   at least two different modulation forms can be used for the broadcast frequency; and
   a dummy burst with a base station specific training sequence is transmitted using a modulation form other than the one currently used for the allocated logical channel, if the channel is occupied but there is no data to transmit.

7. A method according to claim 6, wherein:
   GMSK modulation and 8PSK modulation can be used for the broadcast channel; and
   a GMSK modulated dummy burst is transmitted, if 8PSK modulation is currently used for the logical channel, or vice versa.

8. A method according to claim 1, wherein the transmitted dummy burst includes a fixed bit pattern located in the burst on at least one side of the base station specific training sequence, wherein the fixed bit pattern has, at least partly, a low cross correlation to all possible training sequences defined in the network.

9. A method according to claim 1, wherein the transmitted dummy burst includes a fixed bit pattern located in the burst on at least one side of the base station specific training sequence, wherein the fixed bit pattern is related to that training sequence in a known manner.

10. A method according to claim 8 wherein:
   at least two different modulation forms can be used for the broadcast frequency; and
   the fixed bit pattern is different for the different modulation forms.

11. A method according to claim 1, wherein any DTX mode is disabled for logical channels not applying frequency hopping with the broadcast frequency included in the hopping scheme, such that regular traffic bursts are transmitted even during silent periods.

12. An apparatus for determining the content in bursts to be transmitted from a base station in a mobile network on a broadcast frequency in specific timeslots of a broadcast frequency frame structure, wherein a logical channel is allocated to each timeslot, the apparatus comprising:
   means for receiving information on a forthcoming burst to be transmitted;
   means for checking a current state of the logical channel allocated to the forthcoming burst; and
   means for determining the content in the forthcoming burst depending on the current channel state, wherein a dummy burst with a base station specific training sequence is transmitted if there is no data to transmit, and if the dummy burst cannot be confused with a regular traffic burst according to the current channel state, said dummy burst having data fields containing no intelligible information to mobile terminals.

13. An apparatus according to claim 12, wherein the burst to be transmitted is a dummy burst with a base station specific training sequence if the channel is not occupied, wherein no connected mobile terminal is listening to the channel.

14. An apparatus according to claim 13, wherein:
at least two different modulation forms, including GMSK modulation, can be used for the broadcast frequency; and
the dummy burst is a GMSK modulated dummy burst.

15. An apparatus according to claim 13, wherein the dummy burst to be transmitted belongs to a dummy frame in the form of a fill frame generated at a higher layer in the network, such as a Layer 2 fill frame.

16. An apparatus according to claim 12, wherein:
a single modulation form can be used for the broadcast frequency; and
the burst to be transmitted is a dummy burst with a common fixed bit pattern, if the channel is occupied but there is no data to transmit.

17. An apparatus according to claim 12, wherein:
at least two different modulation forms can be used for the broadcast frequency; and
the burst to be transmitted is a dummy burst with a base station specific training sequence using a modulation form other than the one currently used for the allocated logical channel, if the channel is occupied but there is no data to transmit.

18. An apparatus according to claim 17, wherein:
GMSK modulation and 8PSK modulation can be used for the broadcast channel; and
the burst to be transmitted is a GMSK modulated dummy burst, if 8PSK modulation is currently used for the logical channel, or vice versa.

19. An apparatus according to claim 12, wherein the burst to be transmitted is a dummy burst including a fixed bit pattern located in the burst on at least one side of the base station specific training sequence, wherein the fixed bit pattern has, at least partly, a low cross correlation to all possible training sequences defined in the network.

20. An apparatus according to claim 12, wherein the burst to be transmitted is a dummy burst including a fixed bit pattern located in the burst on at least one side of the base station specific training sequence, wherein the fixed bit pattern is related to that training sequence in a known manner.

21. An apparatus according to claim 12, wherein:
at least two different modulation forms can be used for the broadcast frequency; and
the fixed bit pattern is different for the different modulation forms.

22. An apparatus according to claim 12, comprising means for disabling any DTX mode for logical channels not applying frequency hopping with the broadcast frequency included in the hopping scheme, such that regular traffic bursts are transmitted even during silent periods.

23. An apparatus according to claim 12, wherein the apparatus is located in a base station and/or in a network node controlling plural base stations.

* * * * *